(12) United States Patent
Ristau et al.

(10) Patent No.: US 8,405,400 B2
(45) Date of Patent: Mar. 26, 2013

(54) DEVICE FOR DETECTING INTERRUPTIONS IN A RING BUS

(75) Inventors: Torsten Ristau, Tiefenbach (DE); Lorenz Sommer, Gammelsdorf (DE)

(73) Assignee: Robert Bosch GmbH, Suttgart (DE)

( * ) Notice: Subject to any disclaimer, the term of this patent is extended or adjusted under 35 U.S.C. 154(b) by 896 days.

(21) Appl. No.: 12/197,600

(22) Filed: Aug. 25, 2008

(65) Prior Publication Data

US 2010/0011144 A1    Jan. 14, 2010

(30) Foreign Application Priority Data

Jul. 9, 2008   (DE) .............. 20 2008 009 211 U

(51) Int. Cl.
*G01R 31/08* (2006.01)
(52) U.S. Cl. ........................ 324/525; 324/522
(58) Field of Classification Search ............ 324/522, 324/525
See application file for complete search history.

(56) References Cited

U.S. PATENT DOCUMENTS

| 5,631,795 | A | * | 5/1997 | Koyama | 361/68 |
|---|---|---|---|---|---|
| 6,385,166 | B1 | * | 5/2002 | Takagi et al. | 370/222 |
| 6,957,115 | B1 | * | 10/2005 | Meyer-Grafe et al. | 700/108 |
| 7,082,357 | B2 | | 7/2006 | Fujita et al. | |
| 7,340,437 | B2 | * | 3/2008 | Aberle et al. | 705/58 |
| 7,738,477 | B2 | * | 6/2010 | Hoche et al. | 370/431 |
| 2003/0039243 | A1 | * | 2/2003 | Parker | 370/362 |
| 2004/0153223 | A1 | | 8/2004 | Fujita et al. | |
| 2004/0158781 | A1 | * | 8/2004 | Pihet | 714/712 |
| 2005/0068710 | A1 | * | 3/2005 | Burr et al. | 361/119 |

FOREIGN PATENT DOCUMENTS

| DE | 197 23 737 | 12/1998 |
|---|---|---|
| DE | 10 2004 004 572 | 8/2004 |

* cited by examiner

*Primary Examiner* — Amy He
(74) *Attorney, Agent, or Firm* — Michael J. Striker

(57) ABSTRACT

A device for detecting interruptions in a ring bus has a first interface configured so that it permits connection of a first free end of a line of the ring bus so that the device transmits data to bus elements of the ring bus via the first interface, a second interface configured so that it permits connection of the second free end of the line of the ring bus, and the device detects a creeping interruption of the line of the ring bus.

11 Claims, 2 Drawing Sheets

DEVICE FOR DETECTING INTERRUPTIONS IN A RING BUS

PRIOR ART

Figure 1:
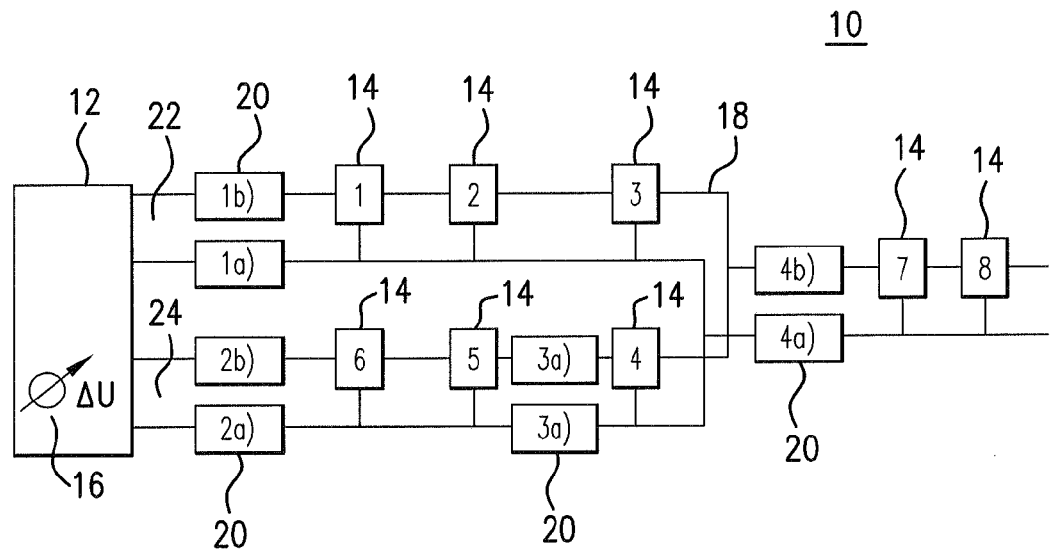

The invention relates to a device for detecting interruptions in a ring bus, and also relates to a network.

A ring bus system is known from the patent application DE 197 23 737 A1. The ring bus system has a central hub to which data lines joined in a ring are connected and into which bus components are connected in a loop.

DISCLOSURE OF THE INVENTION

Advantages of the Invention

The device according to the invention, with the defining characteristics of the independent claim, has the advantage over the prior art that it permits a detection of creeping interruptions in the line of a ring bus. Creeping interruptions are slowly progressing interruptions of lines that do not occur abruptly like a line break, but instead lead to an increase in the resistance in the line that goes unnoticed at first.

It is also advantageous that the device determines the location of the creeping interruption in the line of the ring bus since this makes it possible to clearly isolate the location of the creeping interruption by disconnecting the ring bus. This results in higher availability of the network since all of the bus elements remain operable, with the bus elements of the disconnected ring bus then being triggered by the device from two sides of the ring bus.

It is particularly advantageous if the device is embodied in the form of an alarm center of a hazard alert system, in particular a fire alarm system and/or a burglary alarm system, since it is particularly important for such security-critical systems to enjoy a high degree of operational reliability and a low probability of failure.

The advantages mentioned above for the device apply in a corresponding fashion to the network described below.

Other advantages ensue from the following description of exemplary embodiments made with reference to the drawings and from the dependent claims.

DRAWINGS

The invention will be explained in greater detail below in conjunction with the exemplary embodiment shown in the drawings.

Figure 2:
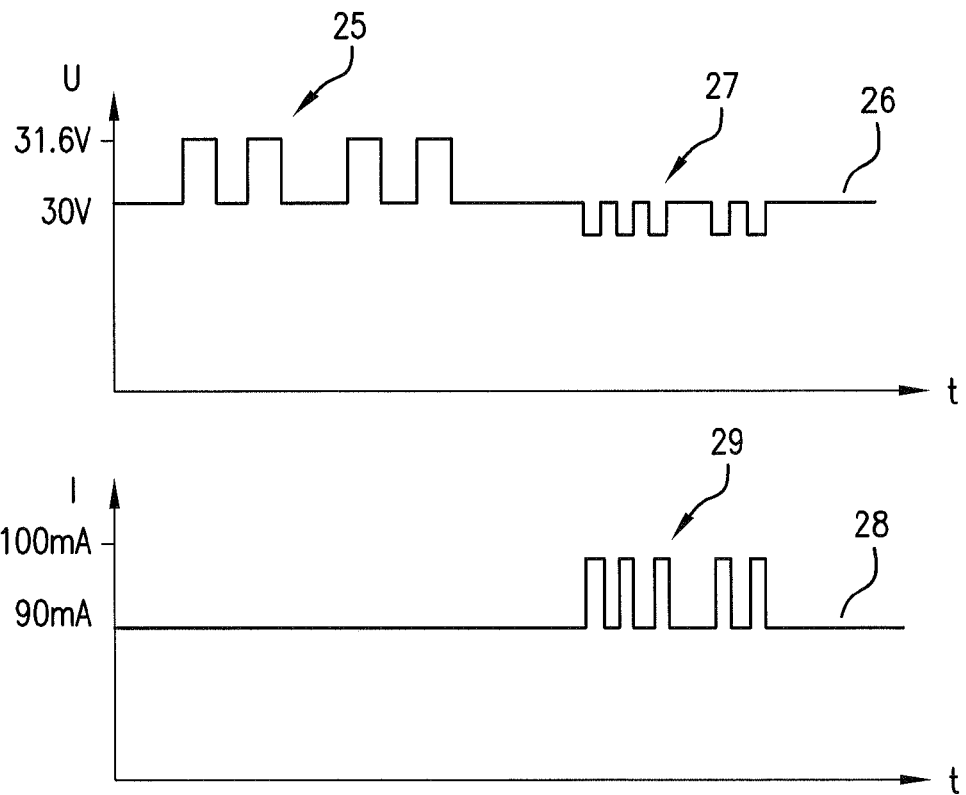
Figure 3:
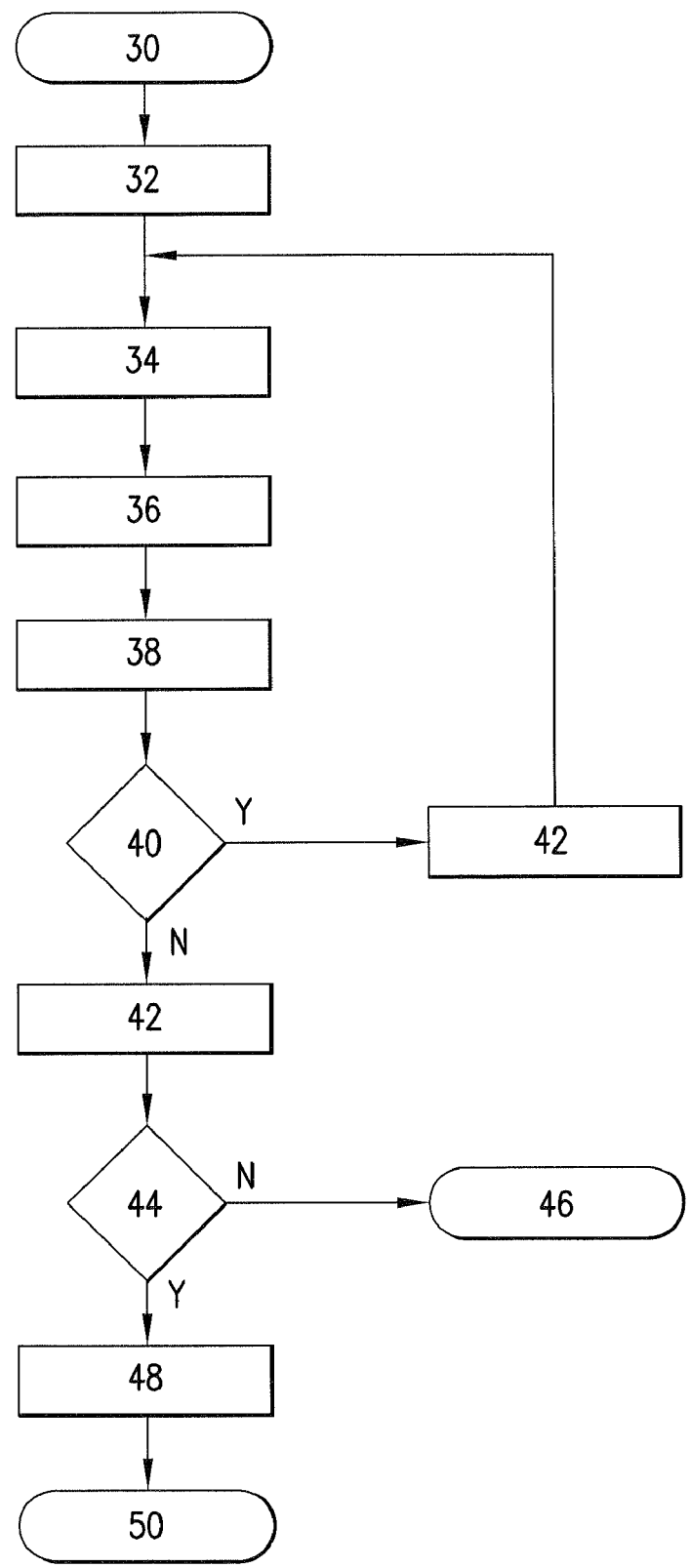

FIG. 1 shows a network,
FIG. 2 shows graphs of voltage and current curves,
FIG. 3 is a flowchart.

DESCRIPTION OF THE EXEMPLARY EMBODIMENTS

FIG. 1 shows a network 10 of the preferred exemplary embodiment, including a device 12 for detecting interruptions and a plurality of bus elements 14 that are connected to the device 12 via a line 18 of the ring bus. The network 10 is a security network of a hazard alert system, in particular a fire alarm system and/or a burglary alarm system. The device 12 is embodied in the form of an alarm center of this hazard alert system. The device 12 includes a first interface 22 to which a free end of the line 18 of the ring bus is connected via a plug connector 20 equipped with contact bushings 1*a* and 1*b*. The device 12 also includes a second interface 24 to which the second free end of the line 18 of the ring bus is connected via another plug connector 20 equipped with contact bushings 2*a* and 2*b*. At the second interface 24, the device 12 also includes a voltage measuring unit 16 that is used to measure the voltage in the ring bus. In FIG. 1, the bus elements 14 are continuously numbered 1 through 8. The bus elements 14 in the preferred exemplary embodiment are embodied in the form of detectors, for example smoke detectors and/or pushbutton alarm trips and/or burglary detectors, and/or are embodied in the form of signaling devices such as optical and/or acoustic signal transducers. The network 10 also includes additional plug connectors 20 that are connected into the line 18 and are equipped with bushings 3*a*, 3*b*, 4*a*, and 4*b*.

In the preferred exemplary embodiment, the ring bus of the network 10 is embodied in the form of a so-called LSN bus (LSN=local security network). As a field bus, the LSN bus permits the redundant connection of up to 254 bus elements 14. Redundancy is achieved through a daisy-chained series connection of the bus elements 14. Since the LSN bus is operated as a ring, each bus element 14 is in a position—and also correspondingly embodied—to isolate the subsequent part of the line 18 while being controlled by the device 12 functioning as an alarm center. The data transmission from the device 12 functioning as an alarm center to the bus elements 14 is carried out via the first interface 22 by means of a serial data flow using voltage modulation. By contrast, the data transmission from the bus elements 14 to the device 12 functioning as an alarm center occurs by means of a serial data flow using current modulation. For the ring bus of the preferred exemplary embodiment, it is also characteristic that all of the bus elements 14 connected to the ring bus consume a constant amount of current. The voltage and current curves will be explained in greater detail below in connection with FIG. 2. In the preferred exemplary embodiment, the device 12 feeds in the current supply of the ring bus via the first interface 22. This first interface 22 is also used to carry out the serial communication from the device 12 to the individual bus elements 14 using voltage modulation. Via the second interface 24, the device 12 uses the voltage measuring unit 16 to measure the bus voltage in both the idle state and with the additional connection of a current to a bus element 14. In the preferred exemplary embodiment, the additionally connected current of the bus element 14 is known. Alternatively or in addition, it is also possible for this additionally connected current to be measured ahead of time. Based on the difference between the two voltages in the idle state and with the additionally connected current, and based on the additionally connected current itself, the device uses an evaluation unit, not shown, to determine the total resistance R from the first interface 22 functioning as the infeed connection of the ring bus to the respective bus element 14 in accordance with the formula $R=U/I$. The evaluation unit of the device 12 uses this procedure on anywhere from a plurality of bus elements 14 to all the bus elements 14 in order to determine the resistance curve of the line 18 of the ring bus. Upon determination of an excessive total resistance change between two successive bus elements 14, the ring bus is disconnected at this location. Alternatively or in addition, the procedure can also be altered so that with regular reception of data from the bus elements 14, the evaluation unit of the device 12 measures the bus voltage of the active and therefore elevated-current bits and based on this, determines the resistance between the first interface 22 of the device 12 and the respective bus element 14 during continuous operation. In the preferred exemplary embodiment, the evaluation unit is composed of a microcontroller and memory elements that carry out programs or program steps in accordance with the flowchart shown in FIG. 3.

FIG. 2 depicts graphs of the voltage and current curves. The upper graph shows the voltage curve 26 that the voltage measuring unit of the device measures at the second interface situated at the second free end of the ring bus. In it, time t is plotted on the abscissa and the voltage U is plotted on the ordinate. In the idle state, a voltage of approximately 30 V is present at the second interface of the device. During transmission of a data flow 25 from the device to a bus element, the bus voltage is modulated. In the process, the bus voltage reaches a value of up to approximately 31.6 V. The lower graph shows the current curve 28 output by a bus element. Time t is plotted on the abscissa of the lower graph and the current I is plotted on its ordinate. In the idle state, all of the bus elements together accommodate a current of approximately 90 mA. During production of a data flow 29 from the bus element, the current is modulated. In the process, the current reaches a peak value of up to approximately 100 mA. The current difference is thus approximately 10 mA. According to the upper graph, this serial data flow 29 using current modulation causes the voltage measuring unit of the device to detect a voltage-modulated data flow 27 at the second interface situated at the second free end of the ring bus. Based on the voltage differences determined by the voltage measuring unit at the second interface situated at the second free end of the ring bus during the current-modulated data flow 29, the knowledge of the current difference during the serial data flow 29 of the bus element, and the knowledge of the triggered bus element itself, the evaluation unit determines the total resistance between the first free end of the ring bus and the triggered bus element.

FIG. 3 shows a flowchart of the preferred exemplary embodiment. After the start 30 of the process, in process step 32, the first bus element is selected. In the preferred exemplary embodiment, the process begins with the first bus element and all of the subsequent bus elements are selected by order of their connection to the ring bus. In process step 34, the device generates a data word composed of an address component and a command component. The device transmits this data word in the form of a serial data flow using voltage modulation via the first interface to the bus elements connected to the ring bus. The appropriate bus element is selected based on the address in the data word. The bus element being addressed executes the command contained in the data word and produces a serial data flow using current modulation. In the next process step 36, the device uses a voltage measuring unit to measure the voltage in the ring bus at the second interface. Depending on the measured voltages, i.e. the idle voltage and the modulated voltage, and on the known current modulation, in process step 38, the device determines the total resistance between the first interface of the device, i.e. the infeed point of the supply voltage, and the bus element connected to the ring bus that was selected in process step 34. At branch point 40, a check is run as to whether additional bus elements are to be selected. If additional bus elements are to be selected, then the process follows the branch leading to process step 42. In process step 42, the next bus element is selected and the sequence begins again at process step 34. If no further bus elements are to be selected, then the process follows the branch leading to process step 42. In process step 42, the device determines the resistance curve of the entire ring bus, from its first free end to the second free end. This is accomplished by plotting the curve of the total resistance as a function of the position of the bus elements. At the next branch point 44, the device runs a check as to whether a creeping interruption is present in the line of the ring bus. This check for a creeping interruption is carried out by comparing the resistance changes from one bus element to the next with a predetermined threshold value. If the resistance change is greater than the threshold value, then this is interpreted as a creeping interruption. If no creeping interruption is detected, then the process comes to an end at 46. If a creeping interruption is present, then the process follows the branch leading to process step 48. In process step 48, the device determines the location of the creeping interruption in the line of the ring bus; the location of the creeping interruption is the location of the bus element at which the resistance change is greater than the predetermined threshold value. The device then sends a data word containing a corresponding command component to the bus elements that are situated immediately before and after the location of the creeping interruption so that the bus elements thus triggered disconnect the ring bus at that point. As a result, the process reaches its end 50.

What is claimed is:

1. A device (12) for detecting interruptions in a ring bus, comprising:
   a first interface (22) connectable to a first free end of a line (18) of the ring bus and configured to transmit data from the device (12) to a daisy chain connection of bus elements (14) of the ring bus,
   a second interface (24) connectable to a second free end of the line (18) of the ring bus and configured to detect a creeping interruption in the line (18) of the ring bus;
   wherein at the second interface (24), the device (12) includes a voltage measuring unit (16) that measures the voltage in the ring bus after the device (12) has triggered a bus element (14) via the first interface (22) and, based on the measured voltage, the device (12) determines the presence of the creeping interruption in the line (18) of the ring bus;
   wherein the device (12) determines the creeping interruption in the line (18) of the ring bus by comparing resistance changes from one bus element to the next with a predetermined threshold value and wherein a resistance change that exceeds the threshold value is interpreted as the creeping interruption.

2. The device (12) as recited in claim 1, wherein the device (12) transmits the data in the form of a serial data flow using voltage modulation to the bus elements (14) connected to the ring bus.

3. The device (12) as recited in claim 1, wherein the device (12) produces data words in the form of digital data, composed of an address component and a command component, in order to trigger a bus element (14) selected using the address.

4. The device (12) as recited in claim 1, wherein based on the measured voltage, the device (12) determines a resistance between the first interface (22) of the device (12) and the bus element (14) connected to the ring bus.

5. The device (12) as recited in claim 4, wherein the device (12) determines the resistance curve of the entire ring bus from its first free end to the second free end.

6. The device (12) as recited in claim 1, wherein the device (12) determines the location of the creeping interruption in the line (18) of the ring bus.

7. A network (10), comprising:
   a device (12) for detecting interruptions,
   an ring bus, and
   bus elements (14) of the ring bus arranged in a daisy chain, wherein a first free end of a line (18) of the ring bus is connected to a first interface (22) of the device (12) enabling the device (12) to transmit data to the bus elements (14) via the first interface (22), wherein a second free end of the line (18) of the ring bus is connected to a second interface (24) of the device (12), and wherein at the second interface (24), the network (10) includes a voltage measuring unit (16) that measures the voltage in the ring bus after the device (12) has triggered a bus element (14) via the first interface (22) and, based on the measured voltage, the device (12) determines the presence of the creeping interruption in the line (18) of the ring bus;

wherein the device (12) determines the creeping interruption in the line (18) of the ring bus by comparing resistance changes from one bus element to the next with a predetermined threshold value and wherein a resistance change that exceeds the threshold value is interpreted as the creeping interruption.

8. The network as recited in claim 7, wherein at the second interface (24), the device (12) includes a voltage measuring unit (16) that measures the voltage in the ring bus after the device (12) has triggered a bus element (14) via the first interface (22) and, based on the measured voltage, the device (12) determines the presence of the creeping interruption in the line (18) of the ring bus.

9. The network (10) as recited in claim 7, wherein the device (12) triggers the bus element (14) of the ring bus so that the bus element (14) produces a serial data flow using current modulation.

10. The network (10) as recited in claim 7, wherein the device (12) disconnects the line (18) of the ring bus at a particular location of the creeping interruption in that the device (12) preferably triggers the bus element (14) immediately before or after the location of the creeping interruption so that the bus elements (14) disconnect the line (18) of the ring bus.

11. The network (10) as recited in claim 7, wherein the device (12) is embodied in the form of an alarm center of a hazard alert system, in particular a fire alarm system or a burglar alarm system.

* * * * *